Patented May 23, 1944

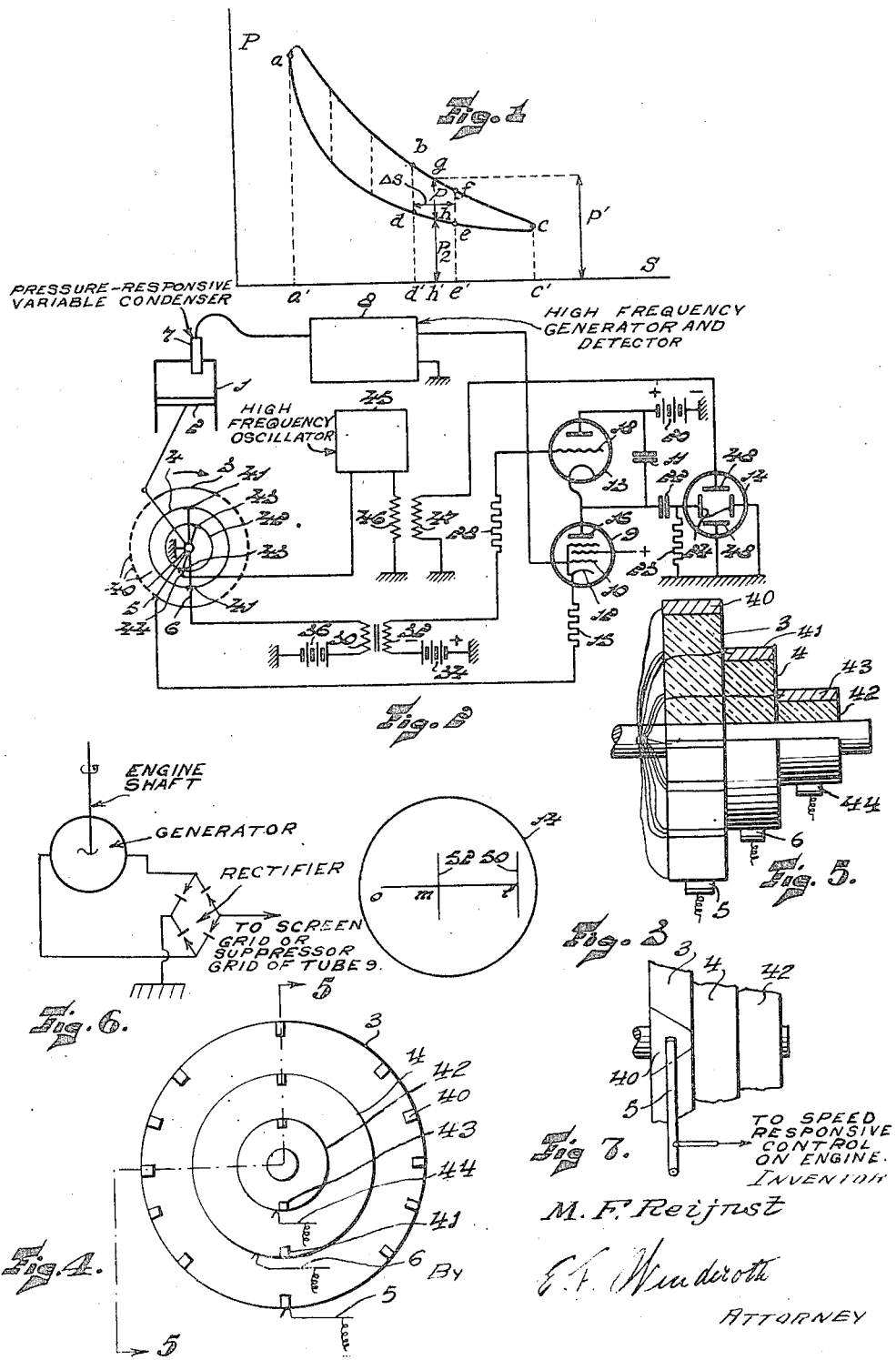

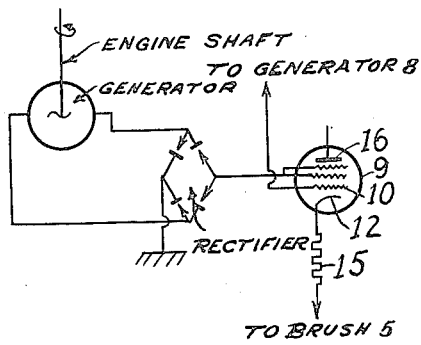
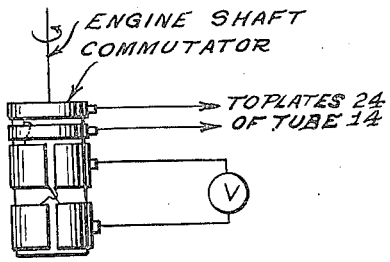
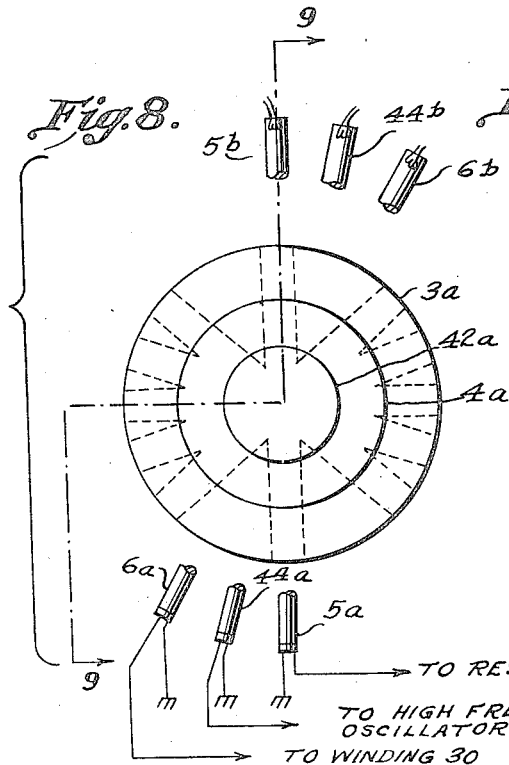
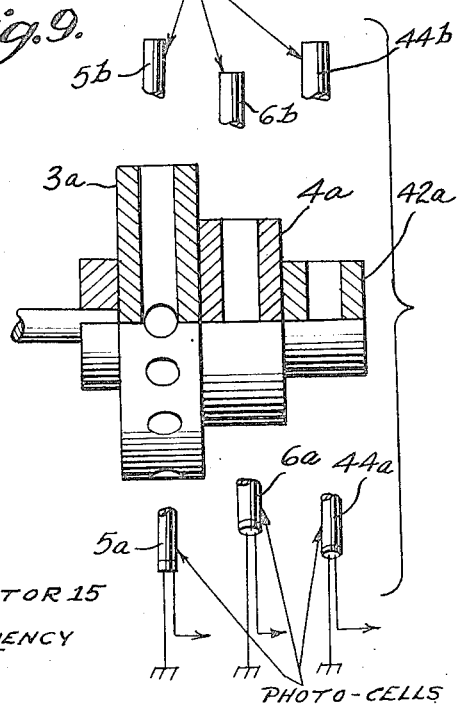

2,349,560

UNITED STATES PATENT OFFICE 2,349,560

DEVICE FOR ASCERTAINING THE OUTPUT OR INPUT OF RECIPROCATING ENGINES

Maximilien Félix Reijnst, Eindhoven, Netherlands; vested in the Alien Property Custodian Application May 29, 1941, Serial No. 395,897
In the Netherlands June 25, 1940

11 Claims. (Cl. 73—30)

For ascertaining the energy delivered or absorbed by a piston engine use is frequently made of the so-called indicator diagram. In this diagram, an example of which is given in Fig. 1 of the accompanying drawings, the pressure P of the gases above the piston is plotted on the vertical axis and the piston on the horizontal axis. The points of reversal of the piston movement are designated $a'$ and $c'$. Fig. 1 may represent the indicator diagram of for example a two-cycle internal-combustion engine; in such an engine the gases in the cylinder are pre-compressed during the movement of the piston in one direction and the piston absorbs energy (back stroke), whereas during the movement of the piston in the other direction the gases take fire and the piston delivers energy (working stroke). The work performed by the piston during the working stroke $abc$ is represented by the surface of the Figure $abcc'a'$. During the back stroke the piston expends an amount of energy which is indicated by the surface $adcc'a'$; the useful work performed is consequently represented by the surface of the figure $abcd$. By measuring the surface area $abcd$ of the indicator diagram, it is possible to determine the work performed per cycle of the piston movement and by multiplying the work per cycle by the speed of the engine the value of the output energy, that is to say the delivered energy without deduction of friction losses or the like, is obtained.

This method exhibits the drawback that taking and measuring the diagram occupies a certain time so that immediate indication of the energy cannot be obtained.

The invention has for its object to provide a device for so determining the energy delivered or absorbed by a piston engine that immediate indication of the indicated energy can be obtained.

In the device according to the invention by means of which this object is attained a measuring condenser is charged with the interposition of a resistance whose value is so controlled by the output voltage of a device for converting the pressure variations that occur above the piston into electrical potential variations that the charging current is at any one moment proportional to the pressure prevailing in the cylinder at that moment, the piston movement being coupled by mechanical means with means by which the charging circuit is closed during short time intervals whose relative time spacings correspond to equal paths traversed by the piston and by which the measuring condenser is discharged in the extreme positions of the piston. In addition, means are provided for indicating the difference between the maximum values of the voltages that occur across the measuring condenser during the working stroke and the back stroke of the piston respectively.

In order that the invention may be clearly understood and readily carried into effect it will now be described more fully with reference to the accompanying drawings in which:

Figure 1 illustrates an indicator diagram for explaining the invention.

Fig. 2 shows one form of apparatus in accordance with the invention.

Fig. 3 illustrates the energy indication obtained with the apparatus of Fig. 2.

Figs. 4 and 5 are detailed views of the contact discs of the apparatus shown in Fig. 2.

Figs. 6, 6a, and 7 illustrate auxiliary control apparatus in accordance with further embodiments of the invention.

Figs. 8 and 9 illustrate a modification of the device according to the invention.

Fig. 10 illustrates the use of a voltmeter as an indicating instrument in the device according to the invention.

For the purpose of determining the surface area of the figure $abcde$ in Fig. 1 which is the difference between the surface areas $abcc'a'$ and $adcc'a'$, the latter two figures may be divided into a plurality ($n$) of equally wide vertical strips (for example $bfe'd'$ and $dee'd'$ respectively having a width $\Delta S$) of approximately trapezoidal form. The surface area of such a strip, for example the strip $bfe'd'$ or $dee'd'$, is consequently equal to the product of the width $\Delta S$ and the height $P_1$ or $P_2$ respectively in the centre of the strip. The surface area of the figure $abcc'a'$ is the sum of the surface areas of the trapezoids and is therefore equal to $\Sigma P_1 \Delta S$. Since the stroke length $a'c'$ of the piston and the number of strips $n$ is always the same, $$\Delta S = \frac{a'c'}{n}$$

is a constant amount. Thus $\Sigma P_1 \Delta S = \Delta S \Sigma P_1$, and $\Sigma P_1$ indicates the surface area $abcc'a'$ on a certain scale, that is to say the energy delivered by a given engine during one working stroke of the piston. Similarly and one the same scale, $\Sigma P_2$ represents the surface area $adcc'a'$ and the energy absorbed during the back stroke of the piston so that $\Sigma P_1 - \Sigma P_2$ indicates the energy delivered per piston cycle.

Fig. 2 shows an example of the device according to the invention. A piston 2 contained within a cylinder 1 whose delivered energy is to be determined drives a shaft carrying two contact discs 3 and 4 which will be described more fully hereinafter and on which slide brushes 5 and 6 respectively. The cylinder 1 contains a device 7 for converting pressure variations into variations of an electric value, for example of a capacity, said device supplying, jointly with a device 8, an output voltage which is proportional to the pressure in the cylinder 1. The device 7 may be constituted, for example, by a condenser one electrode of which is shaped in the form of a diaphragm and is subjected on one side to the pressure that prevails in the cylinder. The device 8 may be for example a high-frequency generator supplying a constant current through the condenser and may contain a detector rectifying the high-frequency voltage across the condenser 7. This rectified voltage is dependent on the impedance of the condenser 7; this impedance depends on the capacity of the condenser and this capacity is inversely proportional to the spacing of the electrodes and hence depends on the deflection of the diaphragm which is acted upon by the pressure P in the cylinder so that this pressure eventually determines the rectified voltage across the condenser 7. For the purpose of obtaining a satisfactory operation the output voltage of the device 8 must be proportional to the pressure P. A suitable construction and circuit arrangement for the pressure responsive condenser and for the device 8 respectively, are shown in U. S. Patent No. 2,178,471 dated October 31, 1939, to S. L. De Bruin.

The output voltage of the device 8 is supplied to the control grid 10 of a discharge tube 9, which in the case illustrated is a pentode. The anode 16 of the tube 9 is connected to one terminal of a condenser 11 whose other terminal is connected to the positive terminal of a source of direct voltage earthed on the other side, for example a battery 20. The condenser 11 is shunted by the anode-cathode circuit of a gas-discharge tube 13. The anode 16 of the tube 9 and the cathode of the tube 13 are interconnected and, with the interposition of a condenser 22, connected to an earthed resistance 23 and to one of the deflecting plates 24 of the cathode-ray tube 14. The other deflecting plate 24 is earthed. The control grid 18 of the tube 13 is normally negatively polarised relatively to the cathode of the tube 13 by a battery 34 via a resistance 28 and the winding 32 of a transformer 30, 32. The brush 6 is connected, with the interposition of the winding 30 of the transformer 30, 32, to one terminal of a battery 36 earthed on the other side.

The cathode 12 of the tube 9 is connected to the brush 5 with the interposition of a resistance 15. The contact discs 3 and 4 are constituted by discs of insulating material respectively carrying earthed conductive contacts 40 and 41 of given width at given distances. The number of contacts 40 on the disc 3 is $2n$, whereas the disc 4 carries two contacts 41 which are so arranged that periodically after one series of $n$ contacts 40 associated with a working or back stroke of the piston has passed past the brush 5, the brush 6 contacts with one of the contacts 41.

The operation of that part of the device shown in Fig. 2 which is hitherto described is as follows: The condenser 11 is charged from the battery 20 with the interposition of the anode-cathode resistance of the tube 9, the resistance 15, the brush 5 and a conductive contact 40 and the smaller the anode-cathode resistance of the tube 9, that is to say the greater the charging current, the more quickly the condenser is charged. The charging current strength is governed by the voltage of the control grid 10 and hence by the pressure in the cylinder 1. The condenser 11, however, is only charged during the moments the brush 5 is placed on one of the contacts 40, otherwise the charging circuit is interrupted. The contacts 40 are so distributed about the circumference of the disc 3 and the number of contacts is such that the brush 5 is placed on a conductive contact 40 each time the position of the piston 2 corresponds to the centre of one of the strips into which the figures $abcc'a'$ and $adcc'a'$ of Fig. 1 are divided (for example to the centre $gh'$ of the strip $bfe'd'$). The number of contacts past which the brush 5 passes per cycle of the piston movement is therefore $2n$. The condenser 11 is thus charged both during the upward and the downward stroke of the piston 2 a given number of times ($n$ times) over a short time interval with a current strength proportional to the instantaneous pressure P in the cylinder 1. Since the time interval over which charging periodically occurs is identical at any one time in the case of constant speed and width of the contacts 40, the charging voltage of the condenser 11 at any one time increases according to the mean pressure P which has prevailed in the cylinder over the charging time interval concerned. The total charging voltage which is given to the condenser during the working stroke is therefore proportional to the value already referred to $\Sigma P_1$ which is a measure of the surface area $abcc'a'$. The total charging voltage which is given to the condenser during the back stroke is proportional to the value already referred to $\Sigma P_2$ which is a measure of the surface $abcc'a'$. The difference between these two charging voltages is consequently a measure of the energy delivered per piston cycle.

In order that optimum proportionality may be obtained between the anode current and the grid voltage of the tube 9 the cathode conductor includes a feedback resistance 15.

Fig. 3 shows the fluorescent screen of the cathode-ray tube 14. Under the influence of the increasing voltage of the condenser 11, which is supplied to the deflecting plates 24, the luminous spot of the cathode-ray tube 14 describes a straight line $ol$ during the working stroke of the piston, and the length of this line depends on the voltage of the condenser and is therefore, a measure of the surface $abcc'a'$. At the end of the working stroke ($abc$), a short time after the brush 5 (Fig. 2) passes over the last contact 40 associated with the working stroke, the brush 6 slides over an earthed contact 41 on the contact disc 4 so that the winding 30 has current passing through it for a short time. This results in a voltage being induced in the winding 32 and being supplied to the grid 18 of the gas-discharged tube 13 so that the tube 13 breaks down and discharges the condenser 11. The luminous spot then snaps back again to the point $o$ (Fig. 3). In the same manner as above described the luminous spot moves from $o$ to $m$ during the back stroke ($adc$) in conformity with the surface $adcc'a'$. The difference in length $lm$ of the lines $ol$ and $om$ is therefore a measure of the surface $abcd$ and hence of the indicated energy. At the end of the back stroke the brush 6 slides again over a contact 41 and the grid 18 is given a positive voltage which brings about a break-down of the tube 13 and a discharge of the condenser 11 so that the cycle described can start again.

The shaft of the engine (Fig. 2) carries a third contact disc 42 over two earthed contacts 43 of which a brush 44 slides in such manner that it slides over one contact after the brush 5 has left the last of the contacts 40 but before the brush 6 comes into contact with the contact 41. The brush 44 is connected to one of the output terminals of a high-frequency oscillator 45 whose other output terminal is connected to one end of the primary 46, earthed on the other side, of the transformer 46, 47. The secondary 47 of the transformer 46, 47 is connected to the deflecting plates 48 of the tube 14.

Immediately after the brush 5 has left the last contact 40 the brush 44 is earthed by one of the contacts 43 with the result that the high-frequency current passes through the winding 46 and induces a high-frequency voltage in the winding 47 which is supplied to the deflecting plates 48. At this moment the luminous spot has arrived, for example after the working stroke, in the point $l$ (Fig. 3) under the influence of the charging voltage of the condenser 11 and is stationary, since the condenser is not charged any further. Under the influence of the high-frequency voltage at the deflecting plates 48 the spot then describes a line 50 normal to the line $ol$ which clearly indicates the place of the point $l$. The place of the point $m$ is similarly indicated by a line 52 which is described at the end of the back stroke due to the passage of the second contact 43 under the brush 44. The indicated energy is therefore clearly indicated by the spacing between the lines 50 and 52.

Generally, the device already comprises a high-frequency oscillator so that the oscillator 45 does not involve a complication. Instead of using the oscillator 45, use may be made of a source of direct voltage.

One form of construction for the discs 3, 4 and 42 is shown in Figs. 4 and 5. As shown each disc consists of insulating material and is provided with its contacts 40, 41 and 43 respectively which contacts are embedded into the periphery of the discs and are electrically interconnected and grounded to the engine shaft on which the discs are mounted. For the purposes of illustration, only twelve contacts 40 are shown whereby each engine stroke is divided into six segments. In practice, however, the use of a greater number of contacts is preferred so that the piston stroke is divided into smaller increments and the accuracy of the energy indication correspondingly increased.

It was assumed hereinbefore that the speed of the engine always remained constant. If such is not the case, for example due to an increase of the speed at a given delivered energy per stroke, the brush 5 will be connected to each of the contacts 40 a proportionately shorter period so that the charging periods of the condenser 11 become shorter, whereas the number of charging periods per stroke remains unvaried at all times. The total charge after each stroke is thus decreased so that the measuring voltage across the condenser 11 is lower in the case of an increasing speed, the measuring voltage being inversely proportional to the speed in the case of invariable energy per stroke. This proportionality permits a determination of the energy by means of a simple calculation.

According to a further object of the invention, there is provided electrical or mechanical means which are coupled to the shaft of the engine and by which the above effect may be compensated thereby avoiding the need for the said calculation. The shaft may, for example, have coupled to it an alternating current generator supplying a control voltage which is proportional to the speed and which after rectification is supplied to, for example, the suppressor grid or the screening grid of the tube 9, thus bringing about an increase in mutual conductance of the tube 9 which is proportional to the speed and which compensates for the shortening of the charging periods. Such an arrangement is shown in Fig. 6.

Compensation may be obtained mechanically, for example, as shown in Fig. 7 by giving the contacts 40 a width which increases in the axial direction and by causing axial displacement of the brush 5 in the direction of the greatest width of the contacts 40 by means of an automatic regulator with increasing speed so that the time during which the brush 5 contacts with a contact 40 is independent of the speed and is unvaried at all times.

The power of the engine, that is to say the energy delivered per second, is equal to the energy delivered per double stroke (cycle) multiplied by the number of cycles per second i. e. the speed. According to the invention, even this multiplication may be performed automatically, viz. by the control voltage obtained by the first-mentioned electrical compensation method being supplied to two grids of the tube 9 both of which have a multiplicative influence on the anode current of this tube by which the condenser 11 is charged. Such an arrangement is shown in Fig. 6a wherein the rectified output voltage of the alternating current generator is applied to both the screen grid and the suppressor grid of the pentode tube 9.

In a modification of the device according to the invention, instead of using the contact discs 3, 4 and 42 with the contacts 40, 41 and 43 and the brushes 5, 6 and 44, use may be made of one or more discs provided with apertures distributed along the circumference of coaxial circles. Opposite the apertures there is on one side of each disc a source of light and on the other side a photo-electric cell. The disposition and arrangement may be such that at moments corresponding to those at which the contacts 40, 41 and 43 would make contact with the associated brushes the photo-electric cells concerned receive light through the apertures and, by means of suitable devices, perform the same functions as the contacts 40, 41 and 43 with the brushes 5, 6 and 44. Such an arrangement is shown in Figs. 8 and 9 in which photo-electric cells 5a, 6a and 44a energized by light pulses passing through apertures in discs 3a, 4a and 42a respectively and derived from lamps 5b, 6b and 44b respectively, serve as switching elements corresponding to the conductive contacts and brushes of the device illustrated in Figs. 2, 4 and 5.

A voltage-measuring instrument may be connected in parallel with the deflecting plates 24 of the tube 14 so as to permit direct reading of the indicated energy. From the foregoing it will be understood that the charging voltage of the condenser 11, which is set up during the back stroke, must be supplied to the voltmeter in a sense opposite to the charging voltage during the working stroke. This may be ensured by means of a commutator on the shaft of the motor which reverses the polarity of the voltage supplied to the voltmeter after every working stroke and back stroke. The foregoing modification is illustrated in Fig. 10.

What I claim is:

1. A device for determining energy values in a piston engine, comprising a measuring condenser, a charging circuit for said condenser including a voltage source and a variable resistance, switching means associated with the piston to intermittently close said charging circuit during short time intervals whose relative time spacings correspond to equal displacements of the piston, means to vary the value of said resistance in accordance with the pressure variations occurring over the piston during its displacement, means to discharge said condenser at the end of the working and back strokes of the piston, and means for indicating the difference between the maximum voltage across the condenser during the working stroke of the engine and the maximum voltage across the condenser during the back stroke of the engine.

2. A device for determining energy values in a piston engine, comprising a measuring condenser, a charging circuit for said condenser including a voltage source and a discharge tube having an anode and a cathode in series with said condenser and voltage source and having a control grid, switching means associated with the piston to intermittently close said charging circuit during short time intervals whose relative time spacings correspond to equal displacements of the piston, means to apply to said control grid a voltage proportional to the pressure variations occurring over the piston of the engine during said time intervals, means to discharge said condenser at the end of the working and back strokes of the engine and means for indicating the difference between the maximum voltage across the condenser during the working stroke and the maximum voltage across the condenser during the back stroke of the engine.

3. A device for determining energy values in an engine having a piston and a rotatable shaft connected thereto, comprising a measuring condenser, a charging circuit for said condenser including a voltage source and a variable resistance, switching means to intermittently close said charging circuit during short time intervals whose relative time spacings correspond to equal displacements of the piston, said means comprising an insulating disc member driven by said shaft and comprising two series of spaced conductive contact members in shunt connection with each other and a brush member in series connection with the charging circuit and adapted to contact said conductive members, means to vary the value of said resistance in accordance with pressure variations occurring over said piston during its displacement, means to discharge said condenser at the end of the working and back strokes of the piston including an insulating disc member driven by said shaft and having two contact laminations and a brush member adapted to contact said laminations at the end of the working and back strokes of the piston, and means for indicating the difference between the maximum voltage across the condenser during the working stroke of the engine and the maximum voltage across the condenser during the back stroke of the engine.

4. A device for determining energy values in a piston engine, comprising a measuring condenser, a charging circuit for said condenser including a voltage source and a variable resistance, switching means associated with the piston to intermittently close said charging circuit during short time intervals whose relative time spacing correspond to equal displacements of the piston, means to vary the value of said resistance in accordance with pressure variations occurring over the piston during its displacement, means to discharge said condenser at the end of the working and back strokes of the piston comprising a gas-filled electric discharge tube having an anode and a cathode connected in parallel with said condenser and having a control grid, means to supply a positive voltage to said control grid at the end of the said strokes of the piston, and means for indicating the difference between the maximum voltage across the condenser during the working stroke of the engine and the maximum voltage across the condenser during the back stroke of the engine.

5. A device for determining energy values in a piston engine, comprising a measuring condenser, a charging circuit for said condenser including a voltage source and a variable resistance, switching means associated with the piston to intermittently close said charging circuit during short time intervals whose relative time spacings correspond to equal displacements of the pitson, means to vary the value of said resistance in accordance with the pressure variations occurring over the piston during its displacement, means to discharge said condenser of the end of the working and back strokes of the piston, and a cathode ray-tube having one set of deflecting plates connected across said condenser.

6. A device for determining energy values in a piston engine, comprising a measuring condenser, a charging circuit for said condenser including a voltage source and a variable resistance, switching means to intermittently close said charging circuit during short time intervals whose relative time spacings correspond to equal displacements of the piston, means to vary the value of said resistance in accordance with the pressure variations occurring over the piston during its displacement, means to discharge said condenser at the end of the working and back strokes of the piston, and a cathode-ray tube having one set of deflecting members connected across said condenser, a second set of deflecting members associated with said cathode-ray tube, and means to apply a high frequency voltage to a said second deflecting members immediately prior to the discharging of said condenser.

7. A device for determining energy values in a piston engine, comprising a measuring condenser, a charging circuit for said condenser including a voltage source and a discharge tube having an anode and a cathode in series with said condenser and voltage source and having a plurality of grid electrodes, switching means associated with the piston to intermittently close said charging circuit during short time intervals whose relative time spacings correspond to equal displacements of the piston, means to apply to one of said grid electrodes a voltage proportional to the pressure variations occurring over the piston during its displacement, means to apply to another of said grid electrodes a voltage proportional to the speed of the engine, means to discharge said condenser at the end of the working and back strokes of the piston and means for indicating the difference between the maximum voltage across the condenser during the working stroke of the engine, and the maximum voltage across the condenser during the back stroke of the engine.

8. A device for determining energy values in a piston engine, comprising a measuring condenser, a charging circuit for said condenser including a voltage source and a discharge tube having an anode and a cathode in series with said condenser and having a plurality of grid electrodes, switching means associated with the piston to intermittently close said charging circuit during time intervals whose relative time spacings correspond to equal displacements of the piston, means to apply to one of said grid electrodes a voltage proportional to the pressure variations occurring over the piston during its displacement, means to apply to two others of said electrodes a voltage proportional to the speed of the engine, means to discharge said condenser of the end of the working and back strokes of the piston, and means for indicating the difference between the maximum voltage across the condenser during the working stroke of the engine and the maximum voltage across the condenser during the back stroke of the engine.

9. A device for determining energy values in a piston engine, comprising a measuring condenser, a charging circuit for said condenser including a voltage source, a resistor element, and a discharge tube having an anode and a cathode in series connection with said voltage source and resistor element and having a control grid, switching means associated with the piston to intermittently close said charging circuit during short time intervals whose relative time spacings correspond to equal displacements of the piston, means to apply to said control grid a voltage proportional to the pressure variations occurring over the piston during said time intervals, means to discharge said condenser at the end of the working and back strokes of the piston, and means for indicating the difference between the maximum voltage across the condenser during the working stroke and the maximum voltage across the condenser during the back stroke of the engine.

10. A device for determining energy values in a piston engine, comprising a measuring condenser, a charging circuit for said condenser including a voltage source and a discharge tube having an anode and a cathode in series connection with said condenser and voltage source and having a control grid, switching means associated with the piston to intermittently close said charging circuit during short time intervals whose relative time spacings correspond to equal displacements of the piston, a pressure responsive device adapted to apply to said control grid a voltage proportional to the pressure variations occurring over the piston during its displacement, a gas-filled electric discharge tube having a cathode and an anode connected in parallel with said condenser and having a control grid, means to apply a positive voltage to said control grid to trip said gas-filled discharge tube at the end of the working and back strokes of the piston, a cathode-ray tube having one set of deflecting plates connected across said condenser, and having a second set of deflecting plates, a high frequency voltage source adapted to be connected to said second set of deflecting plates, and switching means associated with the piston to apply said high frequency voltage source to said second deflection plates immediately prior to the discharging of said condenser.

11. A device for determining energy values in a piston engine, comprising a measuring condenser, a charging circuit for said condenser including a voltage source and a discharge tube having an anode and a cathode connected in series with said condenser and voltage source and having a plurality of grid electrodes, switching means associated with the piston to close said charging circuit during short time intervals whose relative time spacings correspond to equal displacements of the piston, a pressure responsive device adapted to apply to one of said grid electrodes a voltage proportional to the pressure variations occurring over the piston during its displacement, means to apply to two others of said grid electrodes a voltage proportional to the speed of the engine, a gas-filled electric discharge tube having an anode and a cathode connected in parallel with said condenser and having a control grid, means to apply a positive voltage to said control grid to trip said gas-filled discharge tube at the end of the working and back strokes of the piston, a cathode-ray tube having one set of deflecting plates connected across said condenser and having a second set of deflecting plates, a high frequency voltage source adapted to the connected said second set of deflecting plates, and switching means associated with the piston to apply said high frequency voltage source to said second set of deflecting plates immediately prior to the discharge of said condenser.

MAXIMILIEN FÉLIX REIJNST.